G. T. MERRITT.
COTTON GATHERING APPARATUS.
APPLICATION FILED JUNE 27, 1911.
1,052,361.
Patented Feb. 4, 1913.
2 SHEETS—SHEET 1.
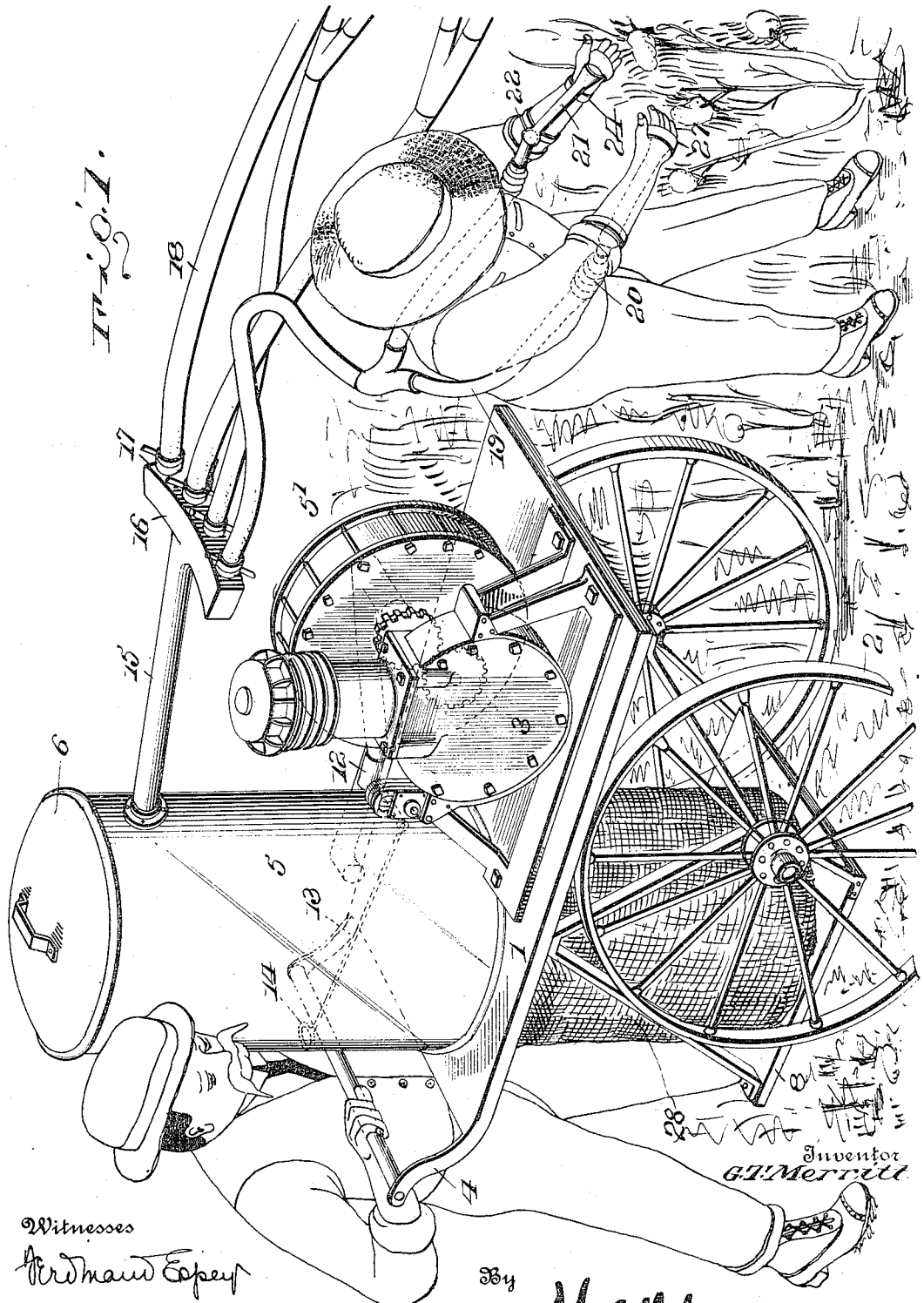

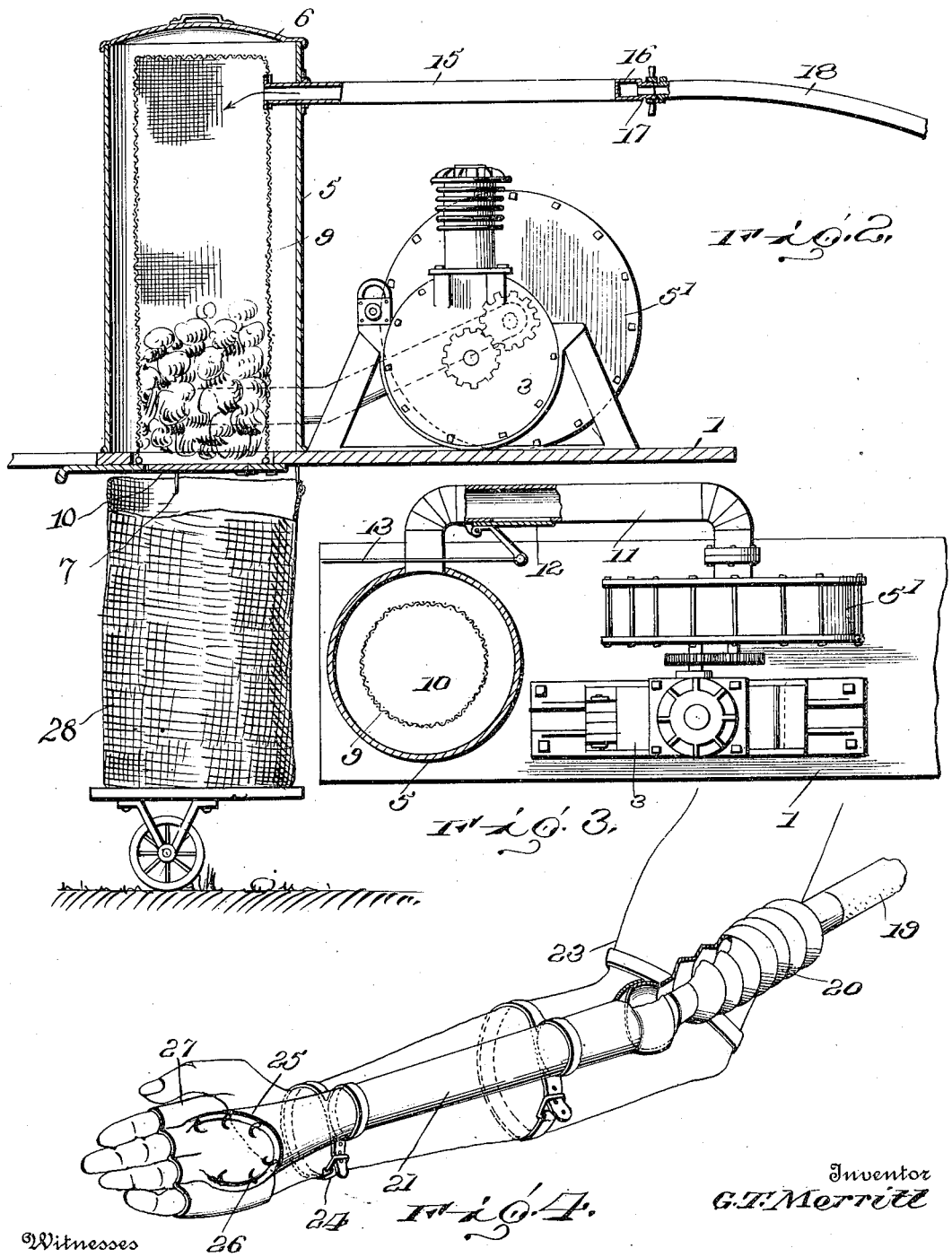

UNITED STATES PATENT OFFICE.

GEORGE T. MERRITT, OF ATLANTA, GEORGIA.

COTTON-GATHERING APPARATUS.

1,052,361.  Specification of Letters Patent.  Patented Feb. 4, 1913.

Application filed June 27, 1911. Serial No. 635,677.

*To all whom it may concern:*

Be it known that I, GEORGE T. MERRITT, a citizen of the United States, residing at Atlanta, in the county of Fulton and State of Georgia, have invented certain new and useful Improvements in Cotton-Gathering Apparatus, of which the following is a specification.

This invention relates to cotton gathering apparatus, and has for its object to provide a device of this character which may be easily and readily moved along a row of standing plants and which is provided with a suction means and a number of suction pipes of especial design which are adapted to be connected with the arms of operators so that their receiving ends may be positioned under or about the cotton as it hangs from the branches of the plants, whereby the said cotton is removed by suction draft from the plants and carried to a receptacle provided for its reception. Means is provided for interrupting the suction draft through the said pipes at short notice, whereby the removal of the cotton from the plants and the movement of the same through the pipes may be quickly checked when desired.

For a full understanding of the invention reference is to be had to the following description and accompanying drawings in which:—

Figure 1 is a perspective view of the apparatus showing the same in operation; Fig. 2 is a vertical sectional view of part of the apparatus; Fig. 3 is a plan view of part of the same; and Fig. 4 is a perspective view of part of the same.

Corresponding and like parts are referred to in the following description and indicated in all the views of the accompanying drawings by the same reference characters.

The apparatus includes a platform 1 which is mounted upon supporting wheels 2 and upon which is located an internal combustion engine of the hydro-carbon type 3. The platform 1 is provided with handles 4 which may be used by an operator for trundling the said platform upon its supporting wheels 2 along a row of standing plants or to any desired point. A suction fan 5' is mounted upon the platform 1 and is operatively connected with the shaft of the engine 3 in any appropriate manner. A cylinder 5 is mounted at its end upon the rear portion of the platform 1 and is closed at its upper end by means of a detachable lid 6.

The lower end of the cylinder 5 is open, and below the lower end of the said cylinder the platform 1 is provided with bag holders or hooks 7 and below the lower end of the said cylinder is located a wheel supported bag rest 8 which is connected with the platform 1 in any suitable manner. A foraminous drum 9 is located within the cylinder 5 and is spaced from the sides thereof. The upper end of the drum 9 is closed by the lid 6, while the lower end of the said drum 9 is normally closed by a hinged valve 10 which is adapted to swing in a downward direction when subjected to the weight of the cotton. The lower portion of the drum 9 is connected with the casing of the fan 5' by means of a pipe 11, the said pipe being provided in its side with a relief valve 12. A rod 13 is pivotally connected at one end with the relief valve 12 and extends back along the handles 4 and is provided at its rear end with a handle grip 14.

A pipe 15 passes through the side of the upper portion of the cylinder 5 and also passes through the upper portion of the drum 9. A concentrator 16 is attached to the outer forward end of the pipe 15 and is provided with a series of nipples 17. Flexible pipes 18 are slipped at their rear ends over the nipples 17 and at their forward ends are connected with flexible branch pipes 19. The said pipes 18 and 19 may be formed from rubber or canvas hose of suitable diameters and appropriate lengths. The sections 19 connect with longitudinally extensible sections 20 which are preferably in the form of accordion-plaited tubes, and the forward ends of the sections 20 are connected with relatively rigid or metallic tubes 21 by means of universal joints, indicated at 22. The sections 20 are provided with bands 23 which are adapted to be placed around the upper arm of an operator, and the tubes 21 are provided with bands 24 which are adapted to be placed around the wrist or lower arm of an operator. The tubes 21 are provided with bell-mouthed receiving ends 25 at the inner edges of which may be located prongs 26. To the side of each tube 21 and at the receiving end portion thereof is attached a mitt 27 which is adapted to be slipped over the hand of the operator and beyond the outer edge of which the fingers of the operator may project in order that the cotton may be readily grasped and directed toward the receiving end of the said tube. Thus the tubes may be positioned upon the arms of an operator and at the same time the fingers of the operator are free to direct and manipulate the cotton during the process of gathering the same.

In operation, the platform 1 is moved along a row of standing plants, as hereinbefore indicated, while the engine 3 is running. When the relief valve 12 is in closed position and the fan 5' is being operated by the engine, suction draft is created through the pipe 11 from the interior of the cylinder 5 which in turn draws the air through the open sides of the drum 9 and the pipe 15, concentrator 16 and pipes 18 and branches 19. Through the said branches the air is drawn through the tubes 21 and as the cotton is directed by the operator into the bell-mouthed receiving end 25 of the tube 21 thereby closing the same the suction draft pulls the cotton from the stems and carries the same along the said tubes and into the drum 9. When the cotton has accumulated sufficiently upon the hinged bottom 10 of the said drum 9, it will fall by its own weight down into a bag 28 supported upon the rest 8 and attached at its edges to the hooks 7. Thus several operators may be manipulating the tubes 21 about the same or several plants bearing cotton. When the bag 28 is filled, the operator who is propelling the platform 1 may pull the rod 13, whereby the relief valve 12 is opened and the suction draft instead of being drawn from the interior of the drum 9 will be taken directly into the pipe 11 through the opening uncovered by the said valve 12, and thus the suction draft through the pipe 15 and its connections is interrupted and the movement of the cotton through the said pipe and its connections is checked. Therefore the filled bag 28 may be removed and an empty bag substituted therefor. After this is done the operator closes the relief valve 12, when the operation of the apparatus, as above described, is continued.

The parts are so arranged that when the valve 10 is closed a suction is created through the pipe 11, and the valve 10 is held in a closed position notwithstanding the fact that the cotton accumulates upon the valve. When it is desired to pass the cotton from the drum 9 into the bag below, the valve 12 is opened without interrupting the operation of the engine 3 or the fan 5', and, therefore, a volume of air enters the pipe 11 directly from the exterior and the valve 10 swings down by gravity and the cotton gravitates from the drum 9 into the bag below. Therefore, it will be seen that the provision of the valve 12 in the pipe 11 in conjunction with the engine and fan serves as a means for holding the valve 10 in a closed position, but when the valve 12 is opened the valve swings down and permits the cotton to pass from the drum into the bag.

Having thus described the invention, what is claimed as new is:

A cotton gathering apparatus comprising a platform, a cylinder mounted thereon, an engine located thereon, a suction draft means mounted upon the platform and operatively connected with the engine, a pipe connected with the suction draft means and the cylinder at the lower part of the side thereof, a valve located in said pipe and adapted to be opened to interrupt the suction draft through the cylinder, a forminous drum supported upon the platform and concentrically located within the cylinder and spaced from the same, a valve hinged to the lower end of the drum and adapted to be held up in a closed position at the lower end of the drum against the action of gravity by suction created through the drum and adapted to swing down by the action of gravity when the suction through the drum is interrupted, and a suction pipe passing through the cylinder and entering the upper portion of the drum.

In testimony whereof, I affix my signature in presence of two witnesses.

GEORGE T. MERRITT. [L. S.]

Witnesses:
W. F. FRASER,
JESSE DRAPER.